United States Patent
Eba

(10) Patent No.: US 7,571,669 B2
(45) Date of Patent: Aug. 11, 2009

(54) MACHINING APPARATUS FOR NONCIRCULAR SHAPES

(75) Inventor: Koji Eba, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/958,010

(22) Filed: Dec. 17, 2007

(65) Prior Publication Data

US 2008/0141836 A1   Jun. 19, 2008

(30) Foreign Application Priority Data

Dec. 18, 2006 (JP) .............................. 2006-339871

(51) Int. Cl.
  *B23B 7/00* (2006.01)
(52) U.S. Cl. .......................................... 82/118; 82/133
(58) Field of Classification Search ................ 82/18, 82/117, 118, 11, 133, 134; 700/174, 175, 700/177; 318/560, 568.17
See application file for complete search history.

(56) References Cited

U.S. PATENT DOCUMENTS

| | | | | |
|---|---|---|---|---|
| 4,712,953 A | * | 12/1987 | Witzel et al. ................ | 409/131 |
| 5,396,434 A | | 3/1995 | Oyama et al. | |
| 5,949,685 A | * | 9/1999 | Greenwood et al. ......... | 700/193 |
| 6,514,018 B2 | * | 2/2003 | Martinez et al. .............. | 408/14 |
| 6,640,677 B2 | * | 11/2003 | Ueda et al. ..................... | 82/129 |
| 7,384,220 B2 | * | 6/2008 | Clark .......................... | 408/13 |

FOREIGN PATENT DOCUMENTS

JP          5-173619          7/1993

OTHER PUBLICATIONS esp@cenet patent abstract for Japanese Publication No. 5173619, Publication date Jul. 13, 1993 (1 page).

* cited by examiner

*Primary Examiner*—Boyer D Ashley
*Assistant Examiner*—Sara Addisu
(74) *Attorney, Agent, or Firm*—Osha • Liang LLP

(57) ABSTRACT

In a noncircular shape machining apparatus, a tool 7 is moved reciprocally in an X-axis direction by a tool-moving mechanism. A first acceleration sensor 6 is disposed on a saddle 11, which is an immovable section of the tool-moving mechanism. Further, a second acceleration sensor 15 is disposed on a spindle bearing 5 of a spindle that holds and causes a workpiece 1 to rotate. Additionally, displacements of the saddle 11 and the workpiece 1 are measured by these two acceleration sensors 6 and 15, and displacement in the relative distance between the workpiece 1 and the tool 7 is acquired as relative displacement on the basis of the two displacements that have been obtained. Additionally, the position of the tool 7 is calculated from the obtained displacement and the output value of an X-axis linear scale 12.

7 Claims, 8 Drawing Sheets

MACHINING APPARATUS FOR NONCIRCULAR SHAPES

PRIORITY INFORMATION

This application claims priority to Japanese Patent Application No. 2006-339871 filed on Dec. 18, 2006, which is incorporated herein by reference in its entirety.

BACKGROUND OF THE INVENTION

1. Field of the Invention

The present invention relates to a noncircular shape machining apparatus such as an NC lathe or an NC grinder that turns, and cuts or grinds a rotating work to produce a manufactured article having a noncircular cross section.

2. Description of the Related Art

As an example of a conventional noncircular shape machining apparatus, the configuration described in JP-A-5-173619 that has the function of correcting machining error is known. Here, operation of a conventional noncircular shape machining apparatus will be described as an example of the machine configuration described in JP-A-5-173619. FIG. 7 is a block diagram of the apparatus, FIG. 8 is a machine configuration diagram (general front diagram) of this conventional noncircular shape machining apparatus.

As shown in FIG. 8, a workpiece 1 is rotated at a certain rotational speed by a spindle motor 3, and the rotational angle is detected by a spindle encoder 4. A tool 7 is attached to a cutting tool carriage 8 that is rectilinearly driven by an X-axis motor 10 so as to reciprocally move in the radial direction (X-axis direction) of the workpiece 1 in accompaniment with the rotation of the X-axis motor 10, and the moving distance is detected by an X-axis linear scale 12. Additionally, the cutting tool carriage 8 is moved forward and backward by the driving of the X-axis motor 10, which is synchronized by a controller with the rotation of the workpiece 1 on the basis of the detected value from the spindle encoder 4, and the workpiece 1 is turned and cut by the tool 7 attached to the cutting tool carriage 8. Further, in order to cause the tool 7 to move in the longitudinal direction of the workpiece 1 (Z-axis direction, direction perpendicular to the page), an X-axis movable section 9 including the cutting tool carriage 8 and a middle carriage is structured such that it can move in an orthogonal direction over a bed 14 by combined use of a Z-axis motor 13 and a saddle 11, which is immovable with respect to the X axis.

FIG. 7 is a functional block diagram of the controller that generates moving commands of the tool 7 synchronously with the angle detected by the spindle encoder 4, and the control contents will be described by reference to this diagram. First, the workpiece 1 is caused to rotate at a desired rotational speed by the spindle motor 3. The spindle encoder 4 detects the rotational angle of the workpiece 1 and transmits a two-phase sinusoidal signal to a spindle encoder interface 24, and the spindle encoder interface 24 outputs the rotational angle $\theta$ of the workpiece 1. A target position $f(\theta)$ of the tool 7 or a value approximating the target position $f(\theta)$ is stored beforehand as a command position $c(\theta)$ in a command position data memory 21, and a command position data reading unit 22 reads the command position $c(\theta)$ corresponding to the rotation angle $\theta$ of the workpiece 1 from the command position data memory 21 and controls an X-axis servo system 23. Additionally, a detected position data writing unit 26 causes the position $a(\theta)$ of the tool 7 detected by the X-axis linear scale 12 to be stored in a detected position data memory 25 with regard to one rotation of the workpiece 1; that is, a range where $\theta$ is from 0° to 360°. The target position $f(\theta)$ of the tool 7 is stored beforehand in a target position data memory 27, and a command position data correcting unit 20 causes storage, in the command position data memory 21, of a corrected command position $cc(\theta)$ in which the command position $c(\theta)$ has been corrected by expression 1 below on the basis of the difference between the target position $f(\theta)$ read from the target position data memory 27 and the detected position $a(\theta)$ read from the detected position data memory 25.

$$cc(\theta)=c(\theta)+(f(\theta+\Delta\theta)-a(\theta+\Delta\theta)) \qquad \text{expression 1}$$

Additionally, the command position data reading unit 22 reads, from the command position data memory 21, the corrected command position $cc(\theta)$ corresponding to the rotational angle $\theta$ of the workpiece 1 that has been read from the spindle encoder interface 24 and controls the X-axis servo system 23. Additionally, the detected position data writing unit 26 causes the position $a(\theta)$ detected by the X-axis linear scale 12 to be stored in the detected position data memory 25 with regard to one rotation of the workpiece 1; that is, a range where $\theta$ is from 0° to 360°. Additionally, the command position data correcting unit 20 determines whether or not the deviation between the detected position $a(\theta)$ that has been read from the detected position data memory 25 and the target position $f(\theta)$ that has been read from the target position data memory 27 is equal to or greater than a certain value, and when the deviation is equal to or greater than the certain value, the command position data correcting unit 20 ends all processing. On the other hand, when the deviation is not equal to or greater than the certain value, the command position data correcting unit 20 substitutes the command position $c(\theta)$ with the corrected command position $cc(\theta)$ and repeats the aforementioned operation.

Incidentally, the aforementioned conventional noncircular shape machining apparatus implements control under the assumption that the output of the X-axis linear scale 12 in FIG. 8 is equal to the relative moving distance between the workpiece 1 and the tool 7. However, when the tool 7 is reciprocally moved at high acceleration on the X axis, or the weight of the tool 7 and the X-axis movable part 9 is heavy, the X-axis movable section 9 receives an accelerating/decelerating reaction force, and the saddle 11 that is the immovable part on the X axis periodically oscillates in the opposite direction. In terms of the entire machine, the center-of-gravity position of the machine does not move by one rotation of the spindle; hence, wobbling of the saddle 11 resulting from X axis reaction and wobbling where the workpiece 1 periodically oscillates via the bed 14 assume substantially opposite phases, and sometimes the change in the relative distance between the two reaches several microns. For this reason, there has arisen the problem that, even when the output value of the X-axis linear scale 12 is controlled to match the target position, the workpiece cannot be machined as intended to its desired outer shape, because of oscillation of the entire machine resulting from the acceleration/decelerating reaction force of the X-axis movable section 9.

SUMMARY OF THE INVENTION

In order to solve this problem, the present invention provides a noncircular shape machining apparatus that controls movement of a tool that is synchronized with the rotation of a workpiece to machine a noncircular shape, the apparatus comprising: a tool-moving mechanism that causes the tool to move rectilinearly, the tool-moving mechanism being disposed with a movable section that is capable of moving and an immovable section that is incapable of moving; first detecting means that detects displacement of the immovable section in a predetermined vector direction that causes the distance between the workpiece and the tool to change; second detecting means that acquires displacement of the workpiece held by a holding member in a predetermined vector direction that causes the distance between the workpiece and the tool to change; relative displacement calculating means that calculates, from the displacement of the immovable section and the displacement of the workpiece that have been detected, displacement between the immovable section and the workpiece as relative displacement; tool position detecting means that detects movement of the tool resulting from the tool-moving mechanism; and means that calculates the actual position of the tool with respect to the workpiece from the movement of the tool and the relative displacement.

In a preferred mode, each of the first detecting means and the second detecting means includes an acceleration sensor that detects acceleration in the predetermined vector direction of the immovable section or the workpiece, a displacement-calculating unit that determines the displacement in the predetermined vector direction of the immovable section or the workpiece by double-integrating the output value of the acceleration sensor, and an offset-measuring unit that periodically calculates an offset value included in the output value of the acceleration sensor from the output value of the acceleration sensor and corrects the output value of the acceleration sensor inputted to the displacement-calculating unit on the basis of the calculated offset value.

In another preferred mode, the noncircular shape machining apparatus further comprises correcting means that corrects the first detecting means and the second detecting means, wherein the correcting means includes a correction-use position sensor that measures change in relative distance between the acceleration sensor of the first detecting means and the acceleration sensor of the second detecting means, correction command generating means that generates a correction command that drives the tool-moving mechanism and causes the tool to move reciprocally at a frequency and amplitude distance that have determined beforehand, a synchronized oscillation measuring unit that extracts, from the output values of the correction-use position sensor and the acceleration sensors obtained when the tool has moved, the predetermined frequency component or an n-order harmonic component as a correction-use component and measures the amplitude and relative phase difference of each correction-use component, and a frequency characteristic configuration section that determines gain error and phase error per frequency of the acceleration sensors on the basis of a comparison between the correction-use component obtained from the output of the correction-use position sensor and the correction-use component obtained from the acceleration sensors.

According to the present invention, displacement of the immovable section and displacement of the workpiece are detected and, on the basis of these two detected displacements, displacement between the immovable section and the workpiece is detected as relative displacement. Additionally, the position of the tool is calculated in consideration of the obtained relative displacement, so that a more accurate tool position can be obtained. As a result, machining precision can be further improved as compared with that obtained conventionally.

DETAILED DESCRIPTION OF THE INVENTION

Below, embodiments of the present invention will be described with reference to the drawings. Note that, in all of the following embodiments, description will be given under that assumption that a rotating motor is used for movement along an X axis, but even when a linear motor is used, no difference results in terms of control, and therefore the present invention can be applied in such a case.

Embodiment 1

Figure 1:
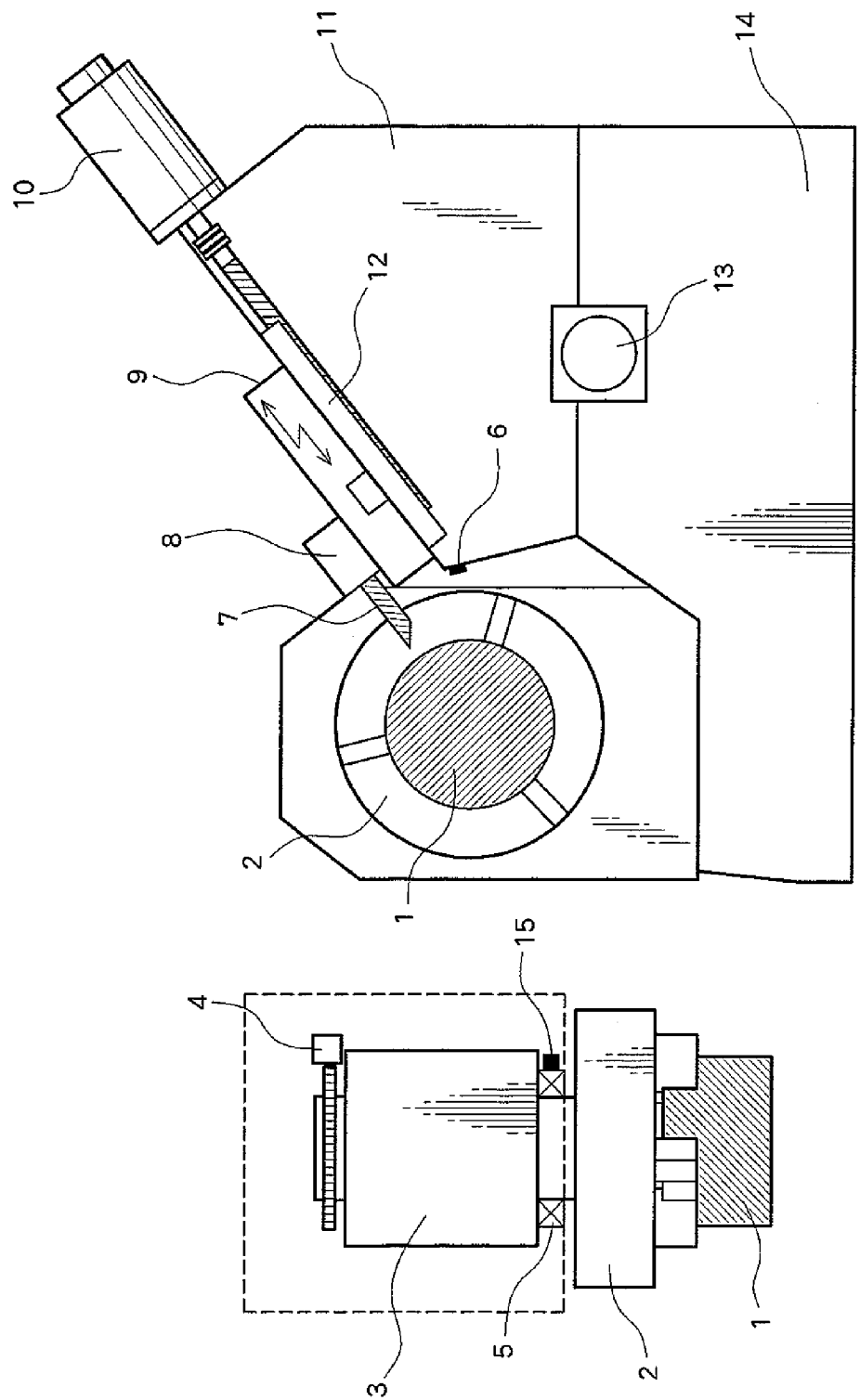
FIG. 1 is a machine configuration diagram showing an example of an embodiment.
Figure 2:
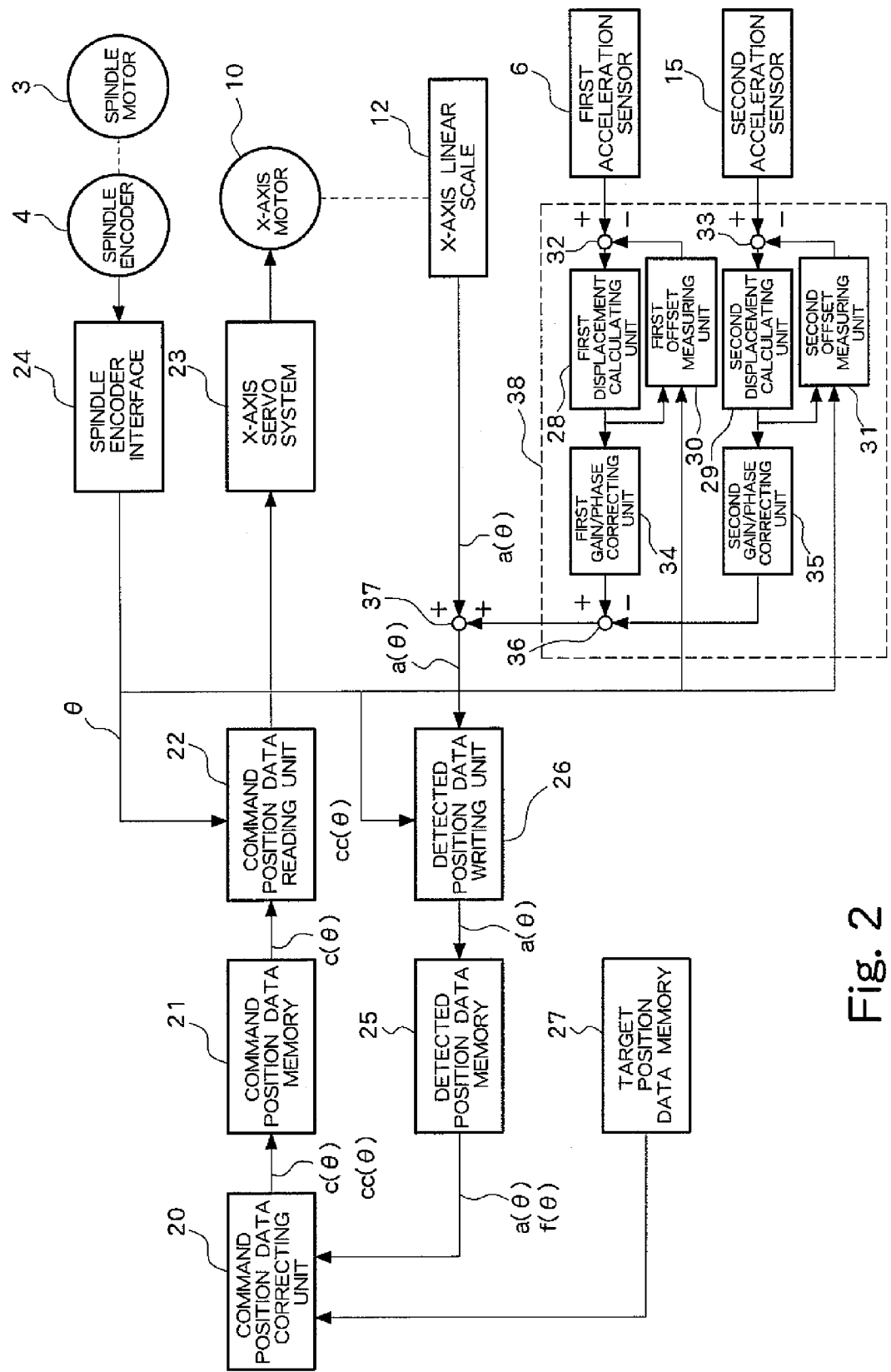
FIG. 2 is a functional block diagram showing an example of an embodiment.
Figure 7:
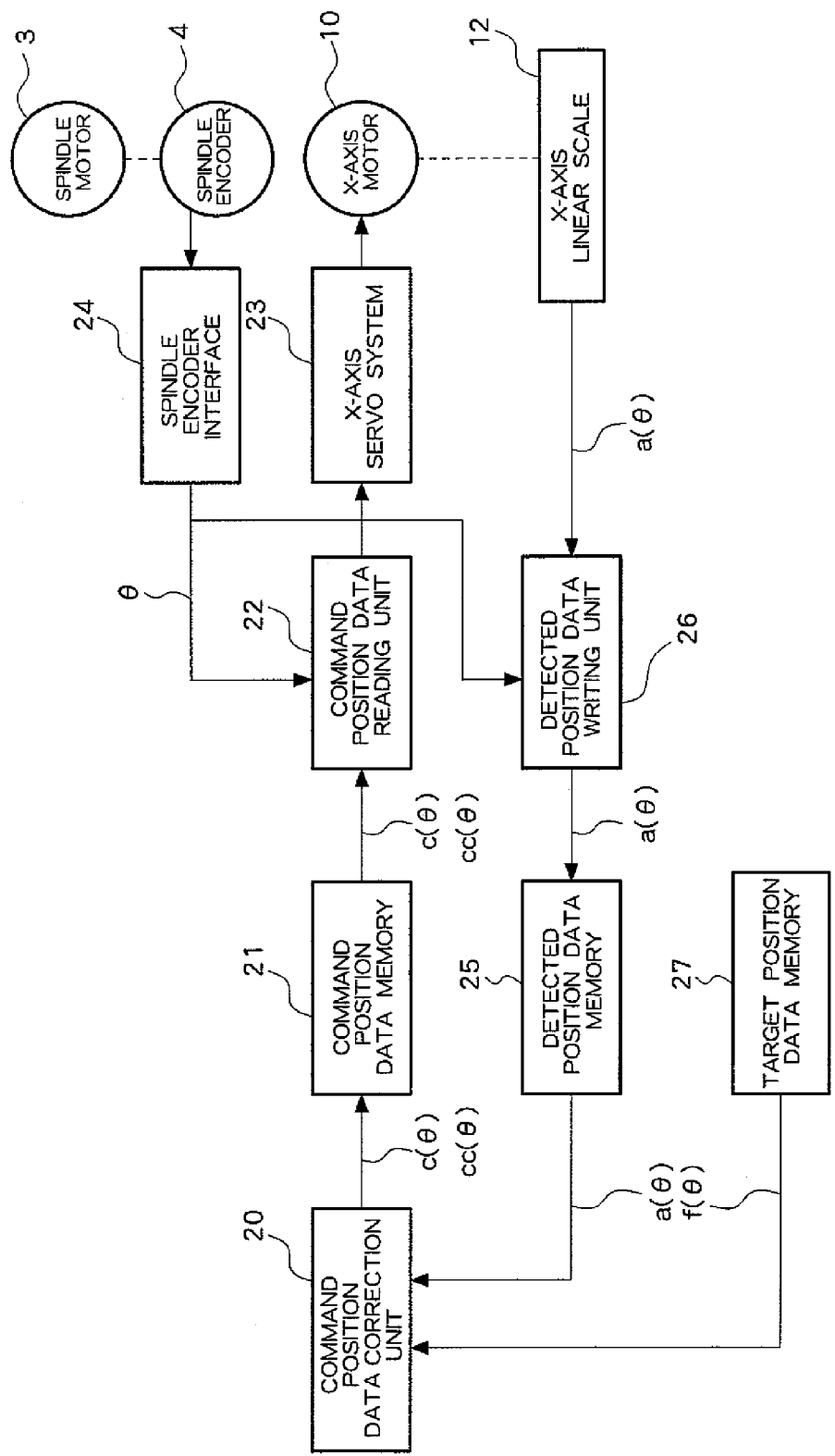
FIG. 7 is a block diagram showing an example of a conventional apparatus.
Figure 8:
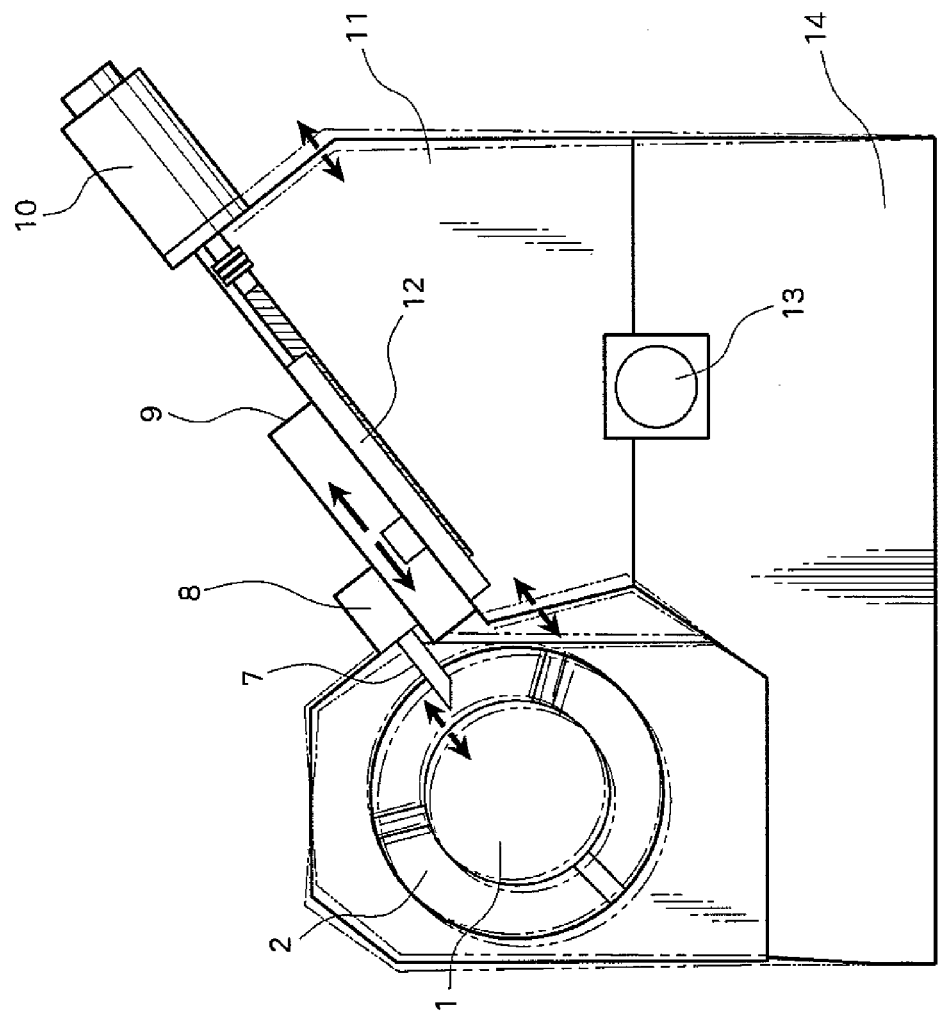
FIG. 8 is a machine configuration diagram showing an example of a conventional apparatus.
Figure 8:
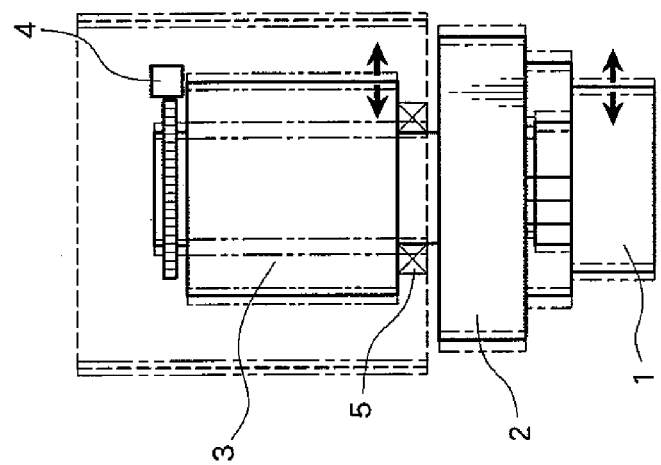

FIGS. 1 and 2 show a general machine configuration and a configuration block diagram of embodiment 1 of the present invention, respectively. In FIGS. 1 and 2, the same reference numerals are assigned to portions having the same functions as those in FIGS. 7 and 8. Further, in the following description, just the points of difference with the conventional apparatus will be principally described.

FIG. 1 is a diagram showing a machine configuration. A first acceleration sensor 6 that detects an acceleration component parallel to a line interconnecting the distal end of a tool 7 and the center of a workpiece 1 is disposed on an end surface of a saddle 11 that faces the workpiece 1, and an X-axis movable section 9 that causes the tool 7 to move is placed on the saddle 11. Here, the saddle 11 functions as an immovable section of a moving mechanism that causes the tool 7 to move rectilinearly, and the first acceleration sensor 6 functions as part of first detecting means that detects displacement of the immovable section. Further, a second acceleration sensor 15 that detects an acceleration component parallel to a line interconnecting the distal end of the tool 7 and the center of the workpiece 1 is added to a spindle bearing 5 of a spindle that causes the work 1 to rotate. Here, the spindle bearing 5 is a member that is in proximity to the workpiece 1 and, when the workpiece 1 is displaced because of oscillation or the like, can be thought of as a member that is displaced in conjunction with the workpiece 1. Consequently, the acceleration detected by the second acceleration sensor 15 attached to the spindle bearing 5 can be considered the acceleration of the workpiece 1. Additionally, the second acceleration sensor 15 functions as part of second detecting means that detects displacement of the workpiece 1.

FIG. 2 is a control block diagram. In addition to the first and second acceleration sensors 6 and 15, elements that are added in relation to the conventional noncircular shape machining apparatus depicted in FIG. 7 include a relative displacement calculating unit 38 that calculates relative displacement between the workpiece 1 and the saddle 11 from the outputs of both of the sensors 6 and 15, and an adder 37 that adds the displacement calculated by the relative displacement calculating unit 38 to the output of the X-axis linear scale 12, and the output a(θ) of the adder 37 is sent to the detected position data writing unit 26. Next, those elements within the relative displacement calculating unit 38 will be described.

The output of a first offset measuring unit 30 to be described later is subtracted by a subtractor 32 from the output of the first acceleration sensor 6 and input to a first displacement calculating unit 28. The first displacement calculating unit 28 integrates the input to determine the speed of the saddle 11 to which the first acceleration sensor 6 is attached, and further integrates the speed to thereby determine the position (displacement). The position of the first acceleration sensor 6 determined by this double integration includes gain error and phase error of the acceleration sensor 6, and therefore the amplitude and phase are corrected by a first gain/phase error correcting unit 34 and input to a subtractor 36. The corrected value of the correction performed by the first gain/phase error correcting unit 34 is a value that is acquired by a later-described correction method and stored beforehand. In the above flow, the value output from the first gain/phase error correcting unit 34 can be said to be a value representing the displacement of the saddle 11. In other words, the first acceleration sensor 6, the first displacement calculating unit 28, the first offset measuring unit 30 and the first gain/phase correcting unit 34 can be said to function as the first detecting means that detects displacement of the immovable section of the moving mechanism.

Incidentally, the output of the first displacement calculating unit 28 is one in which there is measured periodic oscillation where the X axis reciprocates synchronously with the rotation of the workpiece 1, so the same value is repeated so long as the rotational angle of the workpiece 1 is the same. The first offset measuring unit 30 increases/reduces the offset value such that the value output by the first displacement calculating unit 28 becomes the same before and after rotates, which the spindle encoder interfaces 24 outputs. To describe in greater detail the function of the first offset measuring unit 30, ordinarily, the voltage value that is the output of an acceleration sensor gradually changes, and an overall offset occurs. The first offset measuring unit 30 determines, from the output value of the first acceleration sensor 6 obtained in an $N^{th}$ rotation of the workpiece 1, the offset value included in the output value from the first acceleration sensor 6 in that $N^{th}$ rotation. Additionally, the first offset measuring unit 30 feeds back (negatively feeds back) the offset value of the $N^{th}$ rotation that has been calculated and removes the offset from the output value of the first acceleration sensor 6 obtained in the $N+1^{th}$ rotation.

Displacement of the workpiece 1 is also calculated by a similar flow. That is, the output from the second acceleration sensor 15 is input to a second displacement calculating unit 29 after the output of a second offset measuring unit 31 is subtracted therefrom by a subtractor 33. The second displacement calculating unit 29 determines the displacement of the workpiece 1 by double-integrating the input value. Predetermined correction is administered to the obtained displacement by a second gain/phase correcting unit 35, and the corrected displacement is output as the final displacement of the workpiece 1. Further, the displacement calculated by the second displacement calculating unit 29 is also input to the second offset measuring unit 31, and the offset value included in the output value of the second acceleration sensor 15 is calculated.

The output (displacement of the workpiece 1) from the second gain/phase correcting unit 35 is subtracted by the subtractor 36 from the output from (displacement of the saddle 11) the first gain/phase correcting unit 34. The value after this subtraction becomes relative displacement representing relative displacement between the saddle 11 (and therefore the tool 7) and the workpiece 1. This relative displacement can be said to be a value representing the relative displacement of the tool 7 resulting from oscillation or machine flexure occurring in the entire machining apparatus. A more accurate position of the tool 7 can be detected by adding the displacement of the tool 7 resulting from oscillation or the like to the output value from the X-axis linear scale 12. Additionally, the machining apparatus performs learning control in the same manner as in a conventional machining apparatus, on the basis of the accurate tool position.

As will be apparent from the above description, according to the present embodiment, by virtue of provision of the two acceleration sensors, when the tool has been caused to reciprocally move in the X-axis direction, the machining apparatus adds the change in the relative distance occurring between the X-axis immovable section and the workpiece to the position feedback of the tool and learns, so that even when the moving acceleration of the tool is fast or when the tool weight is heavier than normal, the machining apparatus can accurately machine the workpiece outer shape without being affected by dimensional changes resulting from periodic flexural oscillation of each section of the machine. Further, because an acceleration sensor is mounted on the X-axis immovable section and not the X-axis movable section, the acceleration of the X-axis command portion is not superposed on the acceleration sensor, and even when the acceleration sensor does not have a wide dynamic range, it can detect accurate position changes.

Embodiment 2

Figure 3:
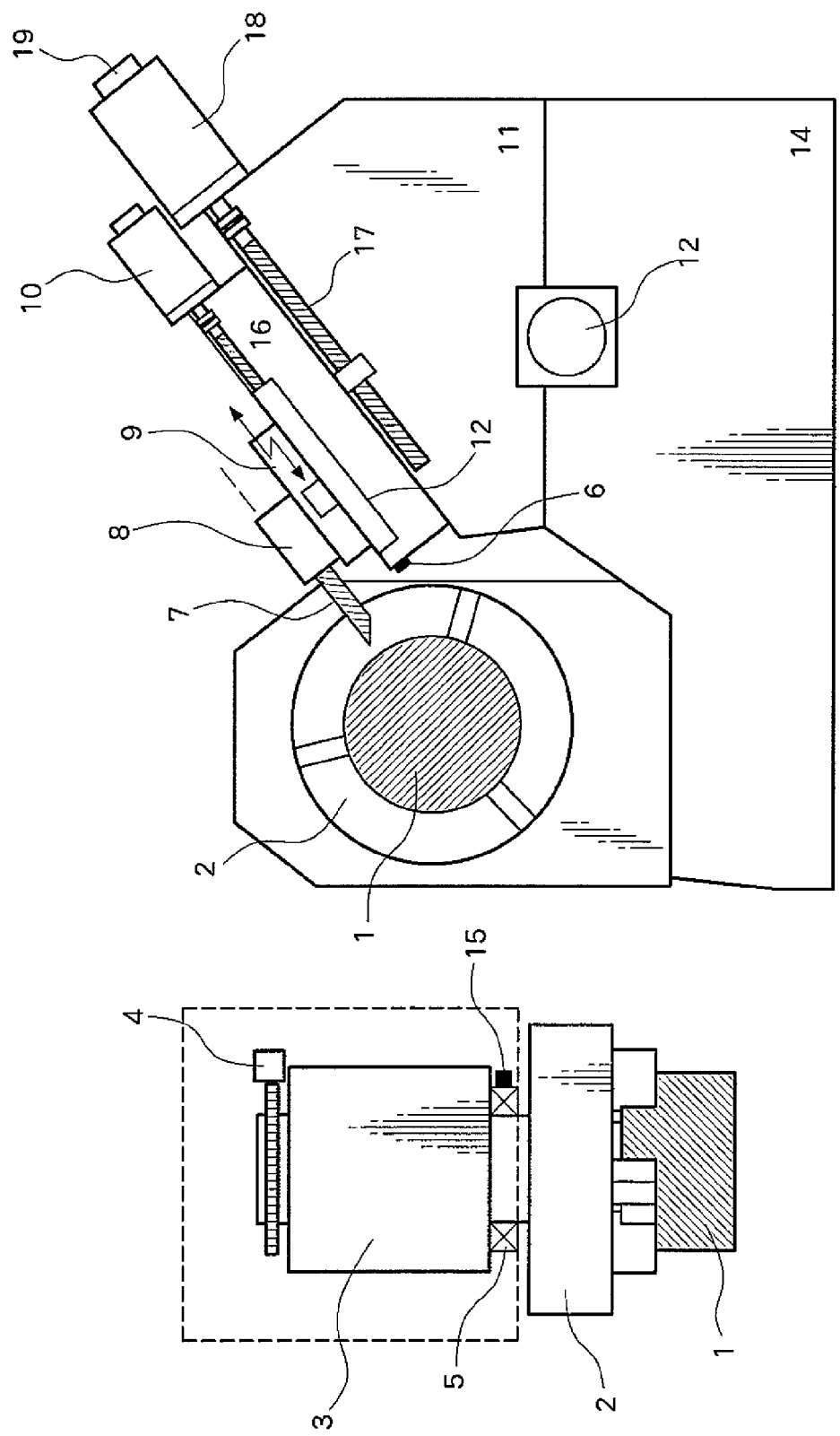
FIG. 3 is a machine configuration diagram showing an example of another embodiment.
Figure 4:
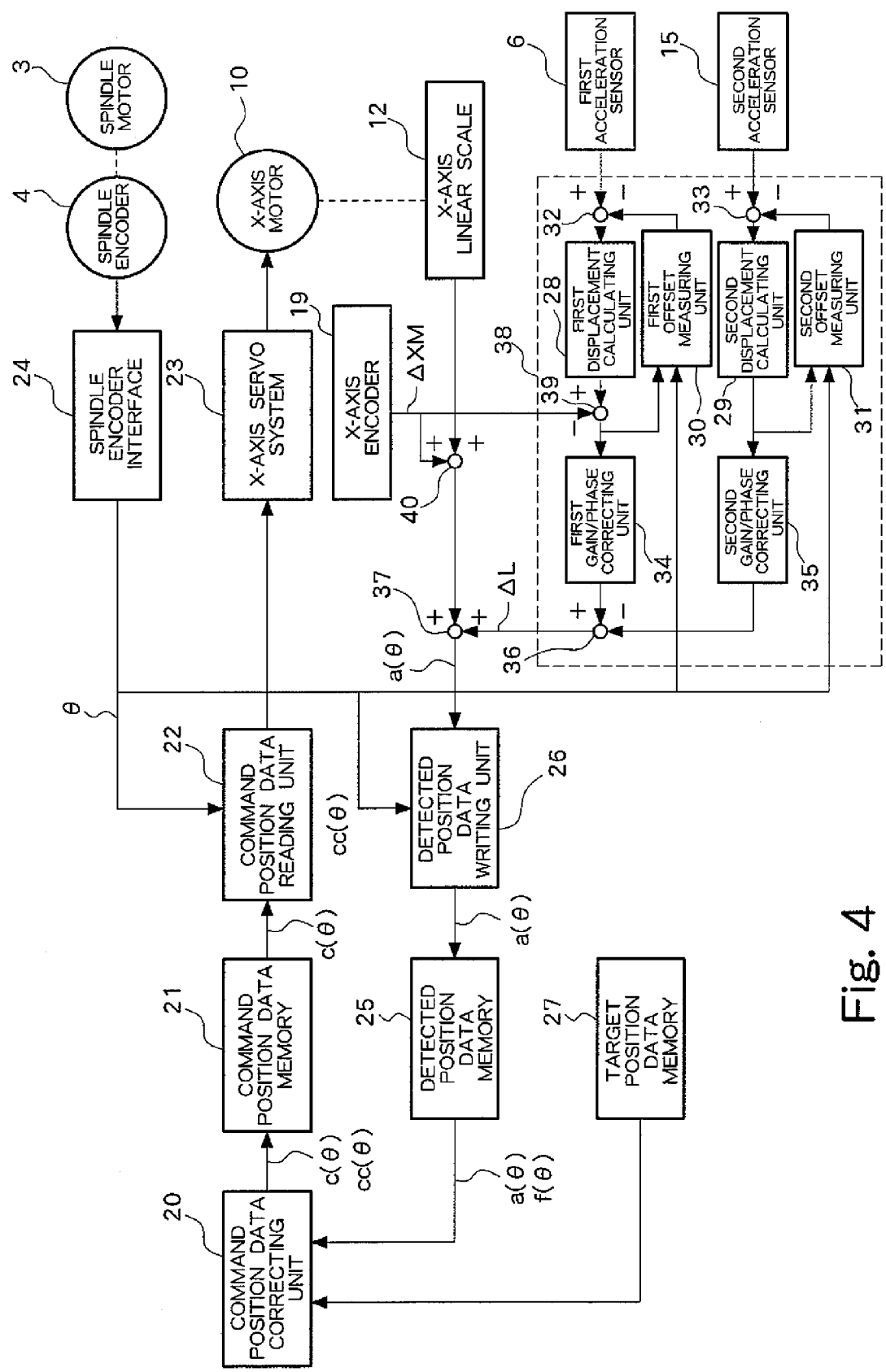
FIG. 4 is a block diagram showing an example of another embodiment.

Next, embodiment 2 of the present invention will be described by reference to FIG. 3 and FIG. 4. In FIG. 3 and FIG. 4, the same reference numerals are assigned to portions having the same functions as those in FIG. 1 and FIG. 2 refer to like elements. Additionally, in the following description, the points of difference with embodiment 1 will be principally described. In the machine configuration of the present embodiment shown in FIG. 3, in order to increase the tool-moving distance in the X-axis direction without increasing the load inertial mass of the X-axis motor 10 that causes the tool 7 to move, the tool-moving mechanism (configured by the X-axis motor 10, the X-axis movable section 9, a middle carriage 16, etc.) is further configured to be movable in the X-axis direction by a second moving mechanism (configured by an XM spindle motor, an XM spindle ball screw, etc.). Specifically, the middle carriage 16, which is an immovable part of the moving mechanism, is in screw engagement with an XM spindle ball screw 17 that self-rotates by an XM spindle motor 18. For that reason, the middle carriage 16, and therefore the entire moving mechanism of the tool 7, is configured to be movable in the X-axis direction in response to the driving of the XM spindle motor 18. In this machine configuration, the second moving mechanism works to cause the offset amount of the tool moving stroke in the X-axis direction to change when the Z-axis coordinate of the saddle 11 changes because of the driving of the Z-axis motor 13, and within one rotation of the workpiece 1, it is common for the same command value to be applied.

In this machine configuration example, the first acceleration sensor 6 is disposed, so as to detect the acceleration component in a direction parallel (X-axis direction) to a line interconnecting the distal end of the tool 7 and the center of the work 1, on the end surface of the middle carriage 16 facing the workpiece, which middle carriage 16 is an immovable section of the tool-moving mechanism. In the control block of FIG. 4, the point of difference from FIG. 2 is that a subtractor 39 is used to subtract the output of an XM spindle encoder 19 from the output of the first displacement calculating unit 28, with the output of the subtractor 39 being input to the first gain/phase correcting unit 34 and the first offset measuring unit 30, and that an adder 40 is used to add the value of the XM spindle encoder 19 to the detected position a(θ). In the machine configuration of FIG. 3, when the X-axis movable section 9 periodically moves at a high acceleration, the middle carriage 16, the saddle 11, and the bed 14 do not just periodically oscillate, but the speed-controlled response of the XM spindle motor 18 is delayed with respect to the reaction force applied to the XM spindle ball screw 17 and end up being turned at a minute angle. The rotational angle of the XM spindle motor 18 is detected by the XM spindle encoder 19 and added to a(θ), and is also subtracted from the output of the first displacement calculating unit 28, to thereby control the size of displacement detected from the first acceleration sensor 6 and further reduce the effect of the offset error and the gain error of the first acceleration sensor 6. Note that, in this system, ordinarily the XM spindle is stopped during one rotation of the spindle and machining resulting from the X axis is performed, but by performing the above-described addition and subtraction, the machining apparatus can perform high-precision correction without being affected by the offset error and gain error of the first acceleration sensor 6 even when operation of the XM spindle is superposed.

Embodiment 3

Figure 5:
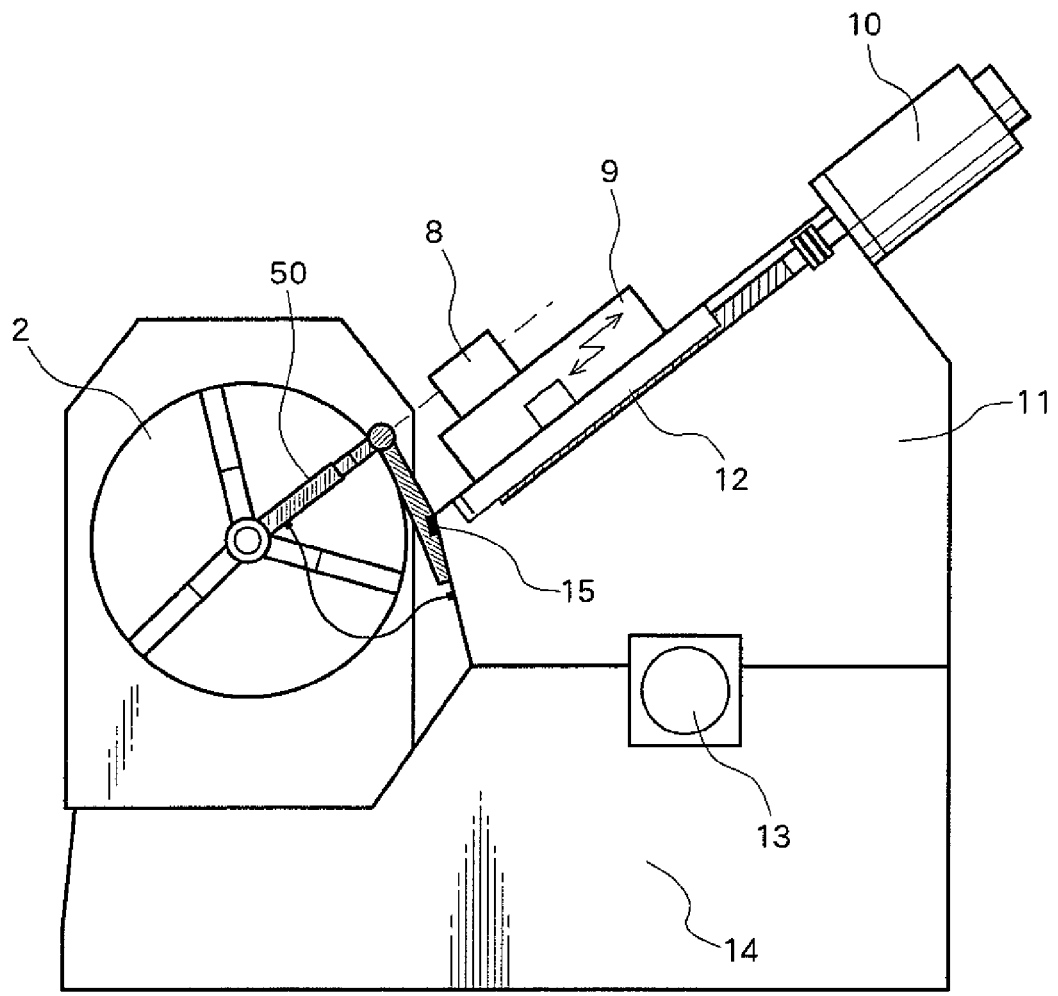
FIG. 5 is a machine configuration diagram showing an example of another embodiment.
Figure 6:
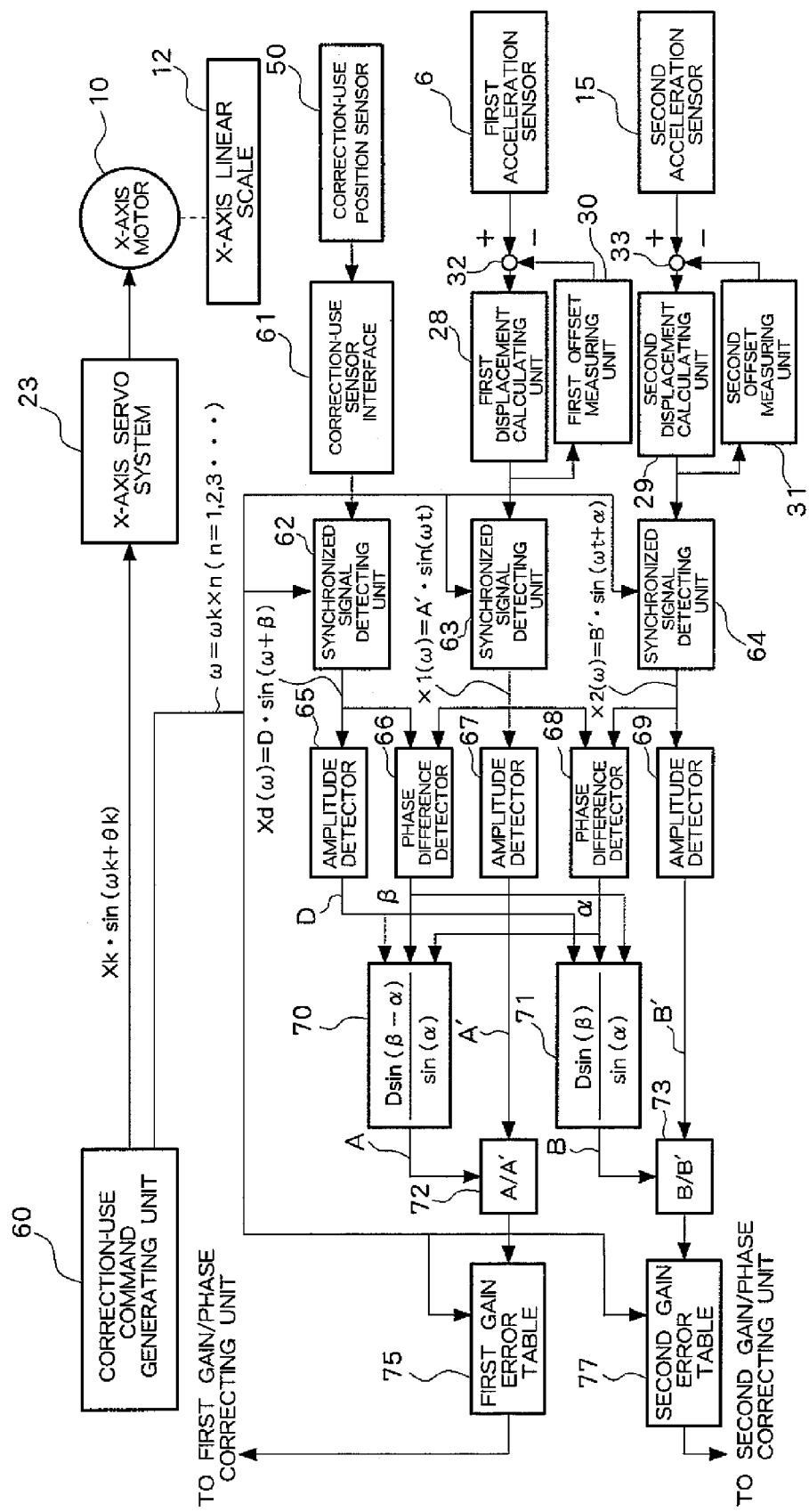
FIG. 6 is a block diagram showing an example of another embodiment.

Next, embodiment 3 of the present invention will be described by reference to FIG. 5 and FIG. 6. Embodiment 3 is the same as embodiment 1 excluding a function of correcting gain and phase error of the first acceleration sensor 6 and the second acceleration sensor 15; therefore, below, just correction of the acceleration sensors will be described. FIG. 5 is a diagram showing a machine configuration example when implementing correction. During correction of the acceleration sensors, a predetermined correction-use position sensor 50 is used. This correction-use position sensor 50 is a sensor usually used in double-ball bar measurement used in the evaluation of the precision of the trajectory of machine tools, and is a rod-like distance sensor where metal balls are attached to both ends. The correction-use position sensor 50 is supported on its spindle side by a seat bitten by a chuck and on its cutting tool side by a magnet and a seat on a jig attached to the saddle 11. The correction sequence using the correction-use position sensor 50 will be described by reference to the control block diagram of FIG. 6.

A correction-use command generating unit 60 applies a sinusoidal position command having a frequency ω at a constant amplitude to the X-axis servo system 23 to cause the X-axis motor 10 to rotate and cause the X-axis movable section 9 to move, whereby the machine is caused to oscillate. The amplitude at this time is selected to be as large as possible beforehand per frequency within the stroke of the tool-moving mechanism and in a range where the torque of the X-axis motor 10 is not saturated. As for the output of the correction-use position sensor 50, the detected position is sent to a synchronized signal detecting unit 62 via a correction-use sensor interface 61. The synchronized signal detecting unit 62 extracts a position detected value Xd(ω) of the frequency component matching the frequency ω sent from the correction-use command generating unit 60. Xd(ω) can be expressed as expression 2 below. Note that, in expression 2, D and β are constants of predetermined values, and t is the angle of rotation.

$$Xd(\omega)=D\times\mathrm{Sin}(\omega t+\beta) \quad\quad \text{expression 2}$$

As for the outputs of the first displacement calculating unit 28 and the second displacement calculating unit 29 that have been calculated from the outputs of the first acceleration sensor 6 and the second acceleration sensor 15, just the components of the frequency ω are similarly retrieved by synchronized signal detecting units 63 and 64 and become x1(ω) and x2(ω). x1(ω) and x2(ω) are expressed by expression 3 and expression 4 below. In expressions 3 and 4, A', B' and α are constants of predetermined values.

$$x1(\omega)=A'\times\mathrm{Sin}\,(\omega t) \quad\quad \text{expression 3}$$

$$x2(\omega)=B'\times\mathrm{Sin}\,(\omega t+\alpha) \quad\quad \text{expression 4}$$

Here, x1(ω) and x2(ω) are expressions representing oscillation arising in the saddle and the spindle bearing, respectively. However, x1(ω) and x2(ω) are both expressions derived from the detection results of the acceleration sensors 6 and 15 prior to correction. Consequently, error is included in the amplitude values A' and B' in x1(ω) and x2(ω). On the other hand, when A and B respectively represent the accurate amplitude values of oscillations X1(ω) and X2(ω) of the saddle and the spindle bearing that do not include error, then the aforementioned Xd(ω) can be expressed by expression 5 below.

$$Xd(\omega)=A\times\mathrm{Sin}\,(\omega t)-B\times\mathrm{Sin}\,(\omega t+\alpha) \quad\quad \text{expression 5}$$

When the accurate amplitude values A and B are expressed by D, α and β from the relationship of expression 5 and expression 2, they become expression 6 and expression 7 below.

$$A=D\times\mathrm{Sin}\,(\beta-\alpha)\div\mathrm{Sin}\,(\alpha) \quad\quad \text{expression 6}$$

$$B=D\times\mathrm{Sin}(\beta)\div\mathrm{Sin}\,(\alpha) \quad\quad \text{expression 7}$$

Of the multiple constants included in expression 6 and expression 7, the amplitude D of Xd(ω) is obtained by inputting Xd(ω) to an amplitude detector 65. Further, the phase β of Xd(ω) is obtained by inputting x1(ω) and x2(ω) to a phase difference detector 66 using x1(ω) as a reference. Moreover, the phase α of X2(ω) is obtained by inputting x1(ω) and x2(ω) to a phase detector 68 using x1(ω) as a reference. Additionally, the amplitudes A and B of X1(ω) and X2(ω) that do not include errors are obtained by inputting D, β and α to calculation blocks 70 and 71 corresponding to above expression 6 and expression 7. As for the gain errors of A' and B', the ratios between the outputs of amplitude detectors 67 and 69 and A and B are calculated by an analog divider, and the gain errors of A' and B' are input to a first gain error table 75 and a second gain error table 77 per frequency ω. When registration in the gain error tables ends with regard to the first frequency ω, then the correction-use command generating unit 60 outputs the next frequency that has been registered beforehand, and the gain errors per frequency that have been determined beforehand are sequentially stored in the gain error tables. The tables for which measurement has ended are sent to the first gain/phase correcting unit 34 and the second gain/phase correcting unit 35 of FIG. 2 and used in the correction of displacement.

What is claimed is:

1. A noncircular shape machining apparatus that controls the movement of a tool tat is synchronized with the rotation of a workpiece to be machined into a noncircular shape, the apparatus comprising:

a tool-moving mechanism that causes the tool to move rectilinearly, the tool-moving mechanism being disposed with a movable section that is capable of moving and an immovable section that is incapable of moving;

first detecting means that detects displacement of the immovable section in a predetermined vector direction that causes the distance between the workpiece and the tool to change;

second detecting means that acquires displacement of the workpiece held by a holding member in a predetermined vector direction that causes the distance between the workpiece and the tool to change;

relative displacement calculating means that calculates, from the displacement of the immovable section and the displacement of the workpiece that have been detected, displacement between the immovable section and the workpiece as relative displacement;

tool position detecting means that detects movement of the tool resulting from the tool-moving mechanism; and means that calculates the actual position of the tool with respect to the workpiece on the basis of the movement of the tool and the relative displacement.

2. The noncircular shape machining apparatus of claim 1, wherein each of the first detecting means and the second detecting means includes an acceleration sensor that detects acceleration in the predetermined vector direction of the immovable section or the workpiece, a displacement calculating unit that determines the displacement in the predetermined vector direction of the immovable section or the workpiece by double-integrating the output value of the acceleration sensor, and an offset measuring unit that periodically calculates an offset value included in the output value of the acceleration sensor on the basis of the output value of the acceleration sensor and corrects the output value of the acceleration sensor input to the displacement-calculating unit on the basis of the calculated offset value.

3. The noncircular shape machining apparatus of claim 2, further comprising correcting means that corrects the first detecting means and the second detecting means, wherein the correcting means includes a correction-use position sensor that measures change in relative distance between the acceleration sensor of the first detecting means and the acceleration sensor of the second detecting means, correction command generating means that generates a correction command that drives the tool-moving mechanism and causes the tool to move reciprocally at a frequency and amplitude distance that have determined beforehand, a synchronized oscillation measuring unit that extracts, from the output values of the correction-use position sensor and the acceleration sensors obtained when the tool has moved, the predetermined frequency component or an n-order harmonic component as a correction-use component and measures the amplitude and relative phase difference of each correction-use component, and a frequency characteristic configuration section that determines gain error and phase error per frequency of the acceleration sensors on the basis of a comparison between the correction-use component obtained from the output of the correction-use position sensor and the correction-use component obtained from the acceleration sensors.

4. A noncircular shape machining apparatus that controls the movement of a tool that is synchronized with the rotation of a workpiece to be machined into a non circular shape, the apparatus comprising:

a tool-moving mechanism that causes the tool to move rectilinearly in a first axis, the tool-moving mechanism being disposed with a movable section that is capable of moving in the first axis and a fixed section that is fixed in the first axis;

a first detecting means that detects displacement of the fixed section in a predetermined vector direction that causes the distance between the workpiece and the tool to change;

a second detecting means that acquires displacement of the workpiece held by a holding member in a predetermined vector direction that causes the distance between the workpiece and the tool to change;

a relative displacement calculating means that calculates, from the displacement of the fixed section and the displacement of the workpiece that have been detected, displacement between the fixed section and the workpiece as relative displacement;

a tool position detecting means that detects movement of the tool resulting from the tool-moving mechanism; and a means That calculates the actual position of the tool with respect to the workpiece on the basis of the movement of the tool and The relative displacement.

5. The noncircular shape machining apparatus of claim 4, wherein the first detecting means comprises:
    a first acceleration sensor that detects acceleration in the predetermined vector direction of the fixed section,
    a first displacement calculating unit that determines the displacement in the predetermined vector direction of the fixed section by double-integrating the output value of the first acceleration sensor, and
    a first offset measuring unit that periodically calculates an offset value included in the output value of the first acceleration sensor on the basis of the output value of the first acceleration sensor and corrects the output value of the first acceleration sensor input to the first displacement-calculating unit on the basis of the calculated offset value; and the second detecting means comprises:
    a second acceleration sensor that detects acceleration in the predetermined vector direction of the workpiece,
    a second displacement calculating unit that determines the displacement in the predetermined vector direction of the workpiece by double-integrating the output value of The second acceleration sensor, and
    a second offset measuring unit that periodically calculates an offset value included in the output value of the second acceleration sensor on the basis of the output value of the second acceleration sensor and corrects the output value of the second acceleration sensor input to the second displacement-calculating unit on the basis of the calculated offset value.

6. The noncircular shape machining apparatus of claim 5, further comprising a correcting means that corrects the first detecting means and the second detecting means, wherein the correcting means comprises a correction-use position sensor that measures change in relative distance between the first acceleration sensor and the second acceleration sensor, a correction command generating means that generates a correction command that drives the tool-moving mechanism and causes the tool to move reciprocally at a frequency and amplitude distance that have been determined beforehand, a synchronized oscillation measuring unit that extracts, from the output values of the correction-use position sensor and the acceleration sensors obtained when the tool has moved, the predetermined frequency component or an n-order harmonic component as a correction-use component and measures the amplitude and relative phase difference of each correction-use component, and a frequency characteristic configuration section that determines gain error and phase error per frequency of the acceleration sensors on the basis of a comparison between the correction-use component obtained from the output of the correction-use position sensor and the correction-use component obtained from the acceleration sensors.

7. The noncircular shape machining apparatus of claim 4, wherein the fixed section is movable in a second axis orthogonal to the first axis.

* * * * *